(12) United States Patent
Murari et al.

(10) Patent No.: US 8,018,819 B2
(45) Date of Patent: Sep. 13, 2011

(54) MICROELECTROMECHANICAL DEVICE HAVING AN ELECTROMAGNETIC MICROMOTOR, IN PARTICULAR MASS STORAGE DEVICE MADE BY PROBE STORAGE TECHNOLOGY

(75) Inventors: Bruno Murari, Monza (IT); Ubaldo Mastromatteo, Bareggio (IT); Giulio Ricotti, Broni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 743 days.

(21) Appl. No.: 12/117,617

(22) Filed: May 8, 2008

(65) Prior Publication Data

US 2011/0058465 A1   Mar. 10, 2011

(30) Foreign Application Priority Data

May 11, 2007   (IT) .............................. TO2007A0328

(51) Int. Cl.
 *G11B 9/00* (2006.01)
(52) U.S. Cl. ....................................... 369/126

(58) Field of Classification Search .................. 369/126, 369/170; 310/12.03, 40 MM, 45; 29/598, 29/596
See application file for complete search history.

(56) References Cited

U.S. PATENT DOCUMENTS 5,327,033 A * 7/1994 Guckel et al. ........... 310/40 MM
7,876,663 B2 * 1/2011 Lantz et al. .................... 369/126

OTHER PUBLICATIONS

Vettiger, P., et al., The "Millipede"—Nanotechnology Entering Data Storage, IEEE Transactions on Nanotechnology, Mar. 2002, pp. 39-55, vol. 1, No. 1.

* cited by examiner

*Primary Examiner* — Ali Neyzari
(74) *Attorney, Agent, or Firm* — Lisa K. Jorgenson; E. Russell Tarleton; Seed IP Law Group PLLC

(57) ABSTRACT

A microelectromechanical device that includes a fixed supporting body, at least one semiconductor body, which is movable with respect to the fixed supporting body, and at least one micromotor for moving the semiconductor body with respect to the fixed supporting body, the micromotor having at least one permanent magnet and a coil, which are coupled together and are movable with respect to one another. A ferromagnetic guide is coupled to the magnet and is shaped so as to concentrate lines of magnetic field generated by the magnet towards the coil.

24 Claims, 8 Drawing Sheets

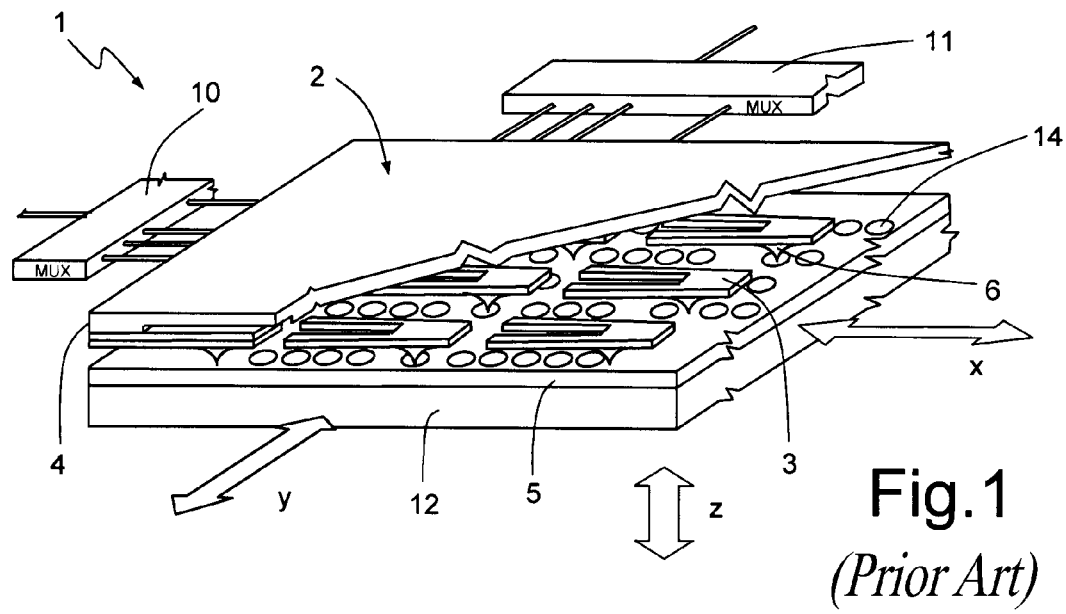
Fig.1 *(Prior Art)*
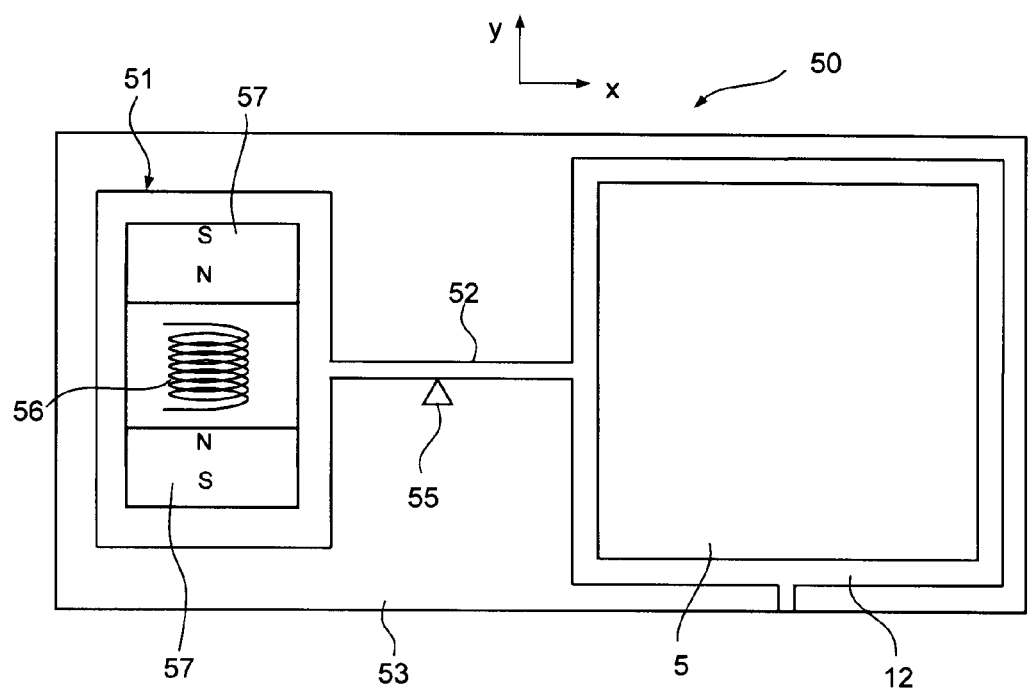
Fig.2 *(Prior Art)*

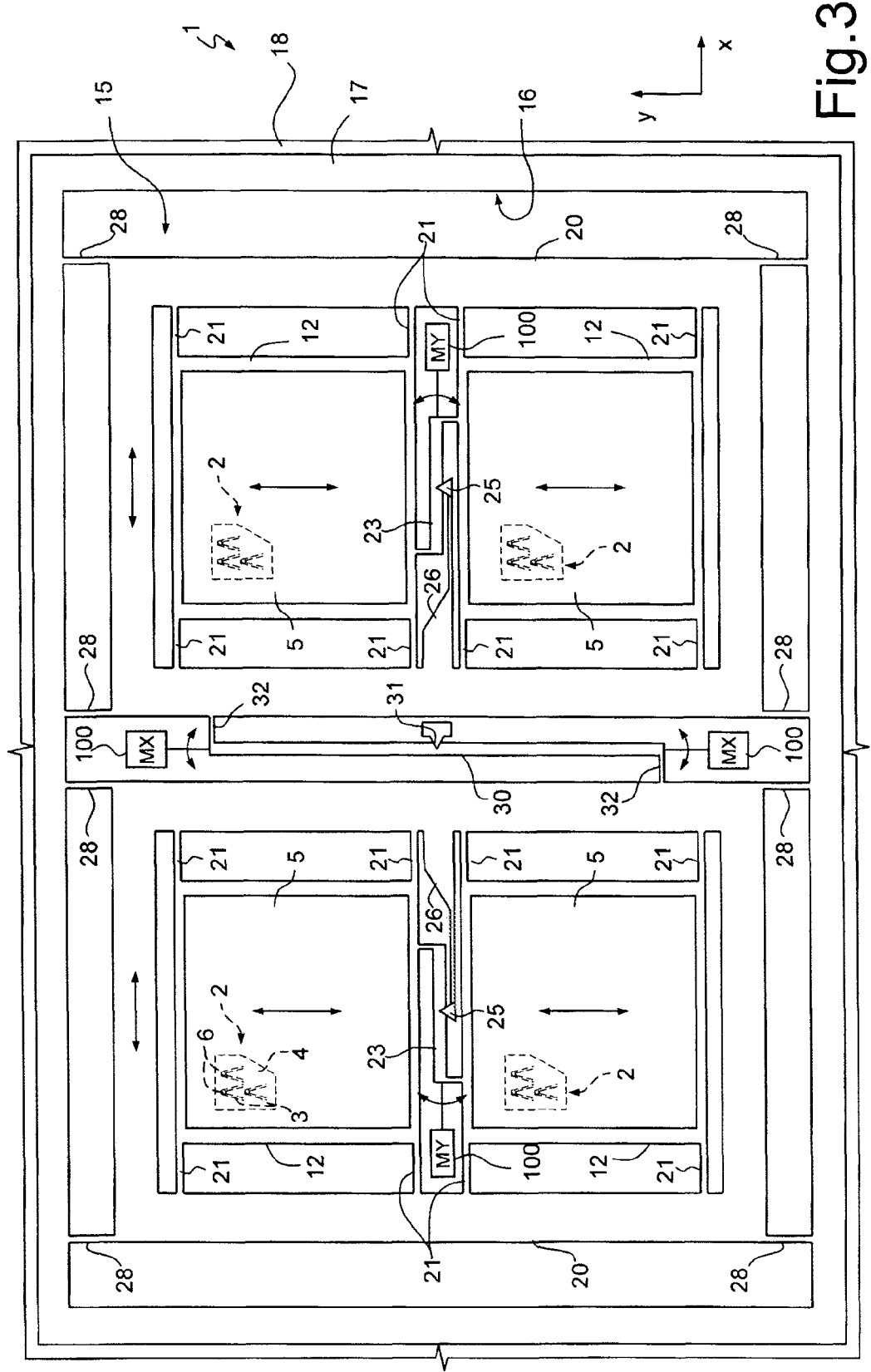

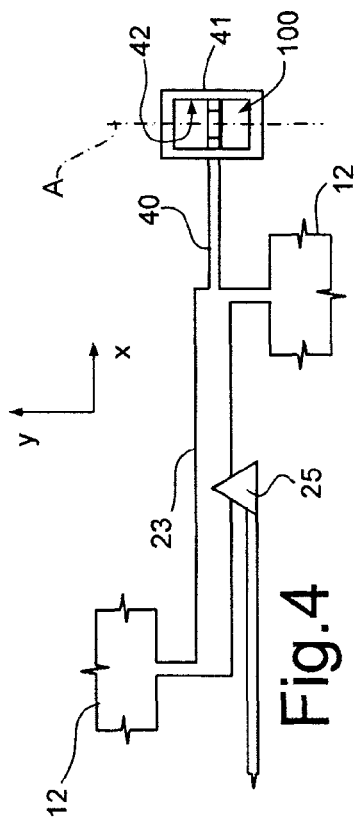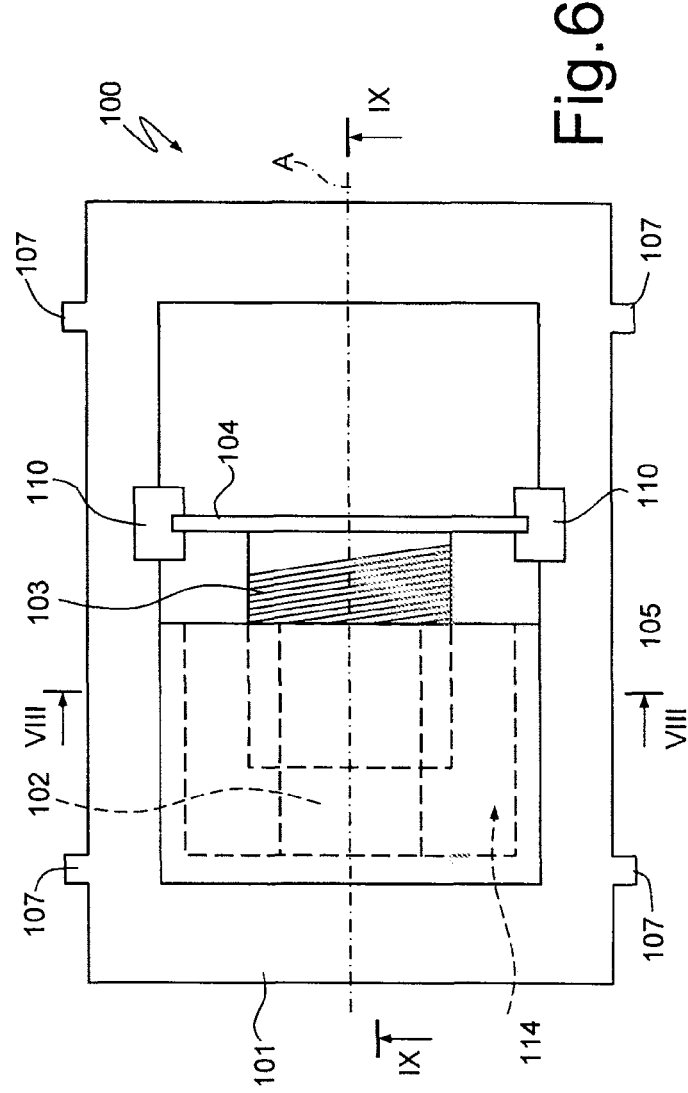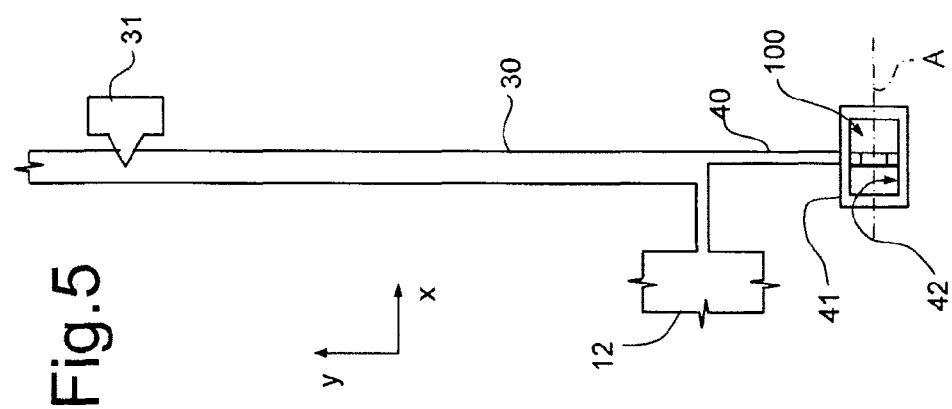

MICROELECTROMECHANICAL DEVICE HAVING AN ELECTROMAGNETIC MICROMOTOR, IN PARTICULAR MASS STORAGE DEVICE MADE BY PROBE STORAGE TECHNOLOGY

BACKGROUND

1. Technical Field

The present disclosure relates to a microelectromechanical device having an electromagnetic micromotor, in particular to a mass storage device made by probe-storage technology.

2. Description of the Related Art

As is known, current data-storage systems that exploit a technology based upon magnetism, such as, for example, computer hard disks, suffer from important limitations as regards the increase in the data-storage capacity and read/write rate and the reduction in their dimensions.

In the last few years, alternative data-storage systems have consequently been proposed, based upon the so-called "probe storage" technology, which exploits techniques of silicon micromachining, in order to reach data-storage densities and read/write rates that cannot be achieved with traditional techniques.

For example, the data-storage system proposed by IBM and referred to as "Millipede" (see in this connection "The "Millipede"-Nanotechnology Entering Data storage", P. Vettiger et al., IEEE Transaction on nanotechnology, Vol. 1, No. 1, March 2002) exploits a type of technology based upon silicon-made, nanometric read/write heads, similar to the one exploited in atomic-force microscopes (AFMs) or in scanning tunnelling microscopes (STMs) to obtain atomic-scale images. For a better understanding, reference may be made to FIG. 1, which shows a general scheme of the "Millipede" system.

As is shown in the figure, a mass storage device 1 according to the "Millipede" system includes a two-dimensional array 2 of cantilever elements 3, made of silicon, obtained by exploiting the micromachining techniques and fixed to a common substrate 4, also made of silicon. Each of the cantilever elements 3 (usually referred to as "cantilevers") functions as support for a respective read/write (R/W) head 6 made in an area corresponding to the end of the respective cantilever 3.

Each individual R/W head 6 can be controlled in reading or writing via an addressing technique similar to the one commonly used in DRAMs, and hence via two multiplexers 10, 11, that select, respectively, the rows and the columns of the two-dimensional array 2.

Present underneath the two-dimensional array 2 is a polymeric film 5 of the thickness of some tens of nanometers, made, for example, of polymethylmethacrylate (PMMA), and having the function of data-storage material. The polymeric film 5 is positioned on a movable platform 12 moved in the (mutually perpendicular) directions x, y via an actuation device (not shown in FIG. 1), including coils and miniaturized permanent magnets coupled so as to form electromagnetic micromotors.

Each R/W head 6 acts within a restricted data-storage area of its own, typically of the order of 100 µm2, so that, for example, in a 32×32 array, 1024 R/W heads 6 are present.

Each individual cantilever 3 performs data storage via the corresponding R/W head 6, by means of formation, in the polymeric film 5, of indentations 14 (shown only schematically in FIG. 1) having widths of, and being space apart by, some tens of nanometers.

The presence or absence of an indentation 14 encodes a datum to be stored in a binary format (for example, the presence of an indentation can represent a "1", whilst the absence of an indentation can represent a "0").

During writing, the indentations 14 are created by applying a local force on the polymeric film 5 through the R/W heads 6 and at the same time by heating locally the same polymeric film 5 to a high temperature (approximately 400° C.). Heating is obtained with a heater element of the resistive or junction type, set in an area corresponding to the R/W head 6 and traversed by electric current. When the R/W head 6 has reached the desired temperature, it is set in contact with the polymeric film 5, which is softened locally by the heat; consequently, the R/W head 6 penetrates within the polymeric film 5, generating the indentation 14.

Reading is carried out using the same heater element as temperature sensor, exploiting the variation of its current-voltage characteristic as a function of the temperature.

The actuation device is an important element in mass storage devices using probe-storage technology in so far as it has to enable positioning of the polymeric film with respect to the cantilevers in an extremely precise way. An inaccurate positioning, in fact, would nullify the advantages deriving from the extremely reduced dimensions of the R/W heads and would not enable the data-storage densities that are theoretically possible to be reached.

FIG. 2 shows a portion of an actuation device 50 of a known type for position control in the direction x. In particular, FIG. 2 illustrates a micromotor 51 connected to the movable platform 12 by an actuation bar 52, which is hinged to a base plate 53 by a fulcrum 55. The micromotor 21 includes a coil 56, fixed to the base plate 53, and two magnets 57, aligned in the direction x and opposite with respect to the coil 56. In addition, both of the magnets 57 are arranged so as to have the same pole facing the coil 56 (pole N in FIG. 2). The magnets 57 are fixed to a supporting frame 58, which is movable with respect to the base plate 53 and to the coil 56. The frame 58 is suspended above the supporting body 53 and is connected to one end of the actuation bar 52. Normally, the movable platform 12, the actuation bar 52, and the frame 58 are made from one and the same semiconductor wafer by micromachining techniques and form a single body.

By controlling the intensity and direction of a current circulating in the coil 56, it is possible to translate the magnets 57 and the frame 58 in the direction x, to obtain an opposite translation of the movable platform 12.

A similar structure, with micromotor and actuation bar (not shown herein) rotated through 90°, is used to translate the movable platform in the direction y.

The micromotor 51 enables a very accurate positioning of the movable platform but is far from efficient on account of the insufficient coupling between the magnets 57 and the coil 56. To obtain a force sufficient to control the movements of the movable platform, it is hence necessary to use magnets 57 of considerable dimensions or supply currents of high intensity for the coil 56. In the first case, the micromotor 51 is cumbersome and occupies an important percentage of the area of the mass storage device 1. In the second case, the consumption levels are sacrificed and worsen, a fact that is in any case disadvantageous.

Also assembly of the micromotor 1 presents difficulties because the magnets 57 must be separately bonded to the frame 58 and aligned to the coil 56. The probability of producing defective pieces is not negligible and adversely affects the production yield and cost.

BRIEF SUMMARY

The present disclosure provides a microelectromechanical device that will enable the limitations described to be overcome.

In accordance with on embodiment of the present disclosure, a microelectromechanical device is provided that includes a fixed supporting body, at least one semiconductor body movable with respect to the fixed supporting body, and at least one micromotor for moving the semiconductor body with respect to the fixed supporting body, wherein the micromotor includes at least one permanent magnet and a coil coupled together and movable with respect to one another, and a ferromagnetic guide coupled to the magnet and shaped so as to concentrate lines of magnetic field generated by the magnet towards the coil.

In accordance with another embodiment of the present disclosure, a system is provided that includes a control unit; a mass storage unit coupled to the control unit, the mass storage unit including a fixed supporting body, at least one semiconductor body movable with respect to the fixed supporting body, and at least one micromotor for moving the semiconductor body with respect to the fixed supporting body, wherein the micromotor includes at least one permanent magnet and a coil coupled together and movable with respect to one another, and a ferromagnetic guide coupled to the magnet and shaped so as to concentrate lines of magnetic field generated by the magnet towards the coil.

In accordance with another embodiment of the present disclosure, a mass storage device is provided that includes a supporting structure, and at least one semiconductor body movable with respect to the supporting structure, and at least one micromotor coupled to the semiconductor body by a connector, the micromotor adapted to move the semiconductor body with respect to the fixed supporting element, the micromotor including at least one permanent magnet and a coil movable with respect to one another, and a ferromagnetic guide coupled to the magnet and shaped to concentrate lines of magnetic field generated by the magnet toward the coil.

In accordance with another aspect of the foregoing embodiment, the device includes an array of cantilevers, each supporting a respective read/write head, a data-storage layer formed on the semiconductor body and arranged adjacent the read/write heads. Ideally, the ferromagnetic guide is cup-shaped, and the magnet is housed within the ferromagnetic guide.

In accordance with another aspect of the foregoing embodiment, the device further includes the ferromagnetic guide and the magnet having a substantially cylindrical shape, and wherein the ferromagnetic guide, the magnet, and the coil are coaxial.

BRIEF DESCRIPTION OF THE SEVERAL VIEWS OF THE DRAWING(S)

For a better understanding of the disclosure, some embodiments thereof will now be described, purely by way of non-limiting example and with reference to the attached plates of drawings, wherein:

FIG. 1 is a schematic representation of a mass storage device of a known type;

FIG. 2 is a simplified top plan view of a portion of the mass storage device of FIG. 1;

FIG. 3 is a top plan view of a microelectromechanical device according to a first embodiment of the present disclosure;

FIG. 4 is an enlarged top plan view of a first detail of the microelectromechanical device of FIG. 3;

FIG. 5 is an enlarged top plan view of a second detail of the microelectromechanical device of FIG. 3;

FIG. 6 is a top plan view of a micromotor incorporated in the microelectromechanical device of FIG. 3, before assembly;

DETAILED DESCRIPTION

Figure 7:
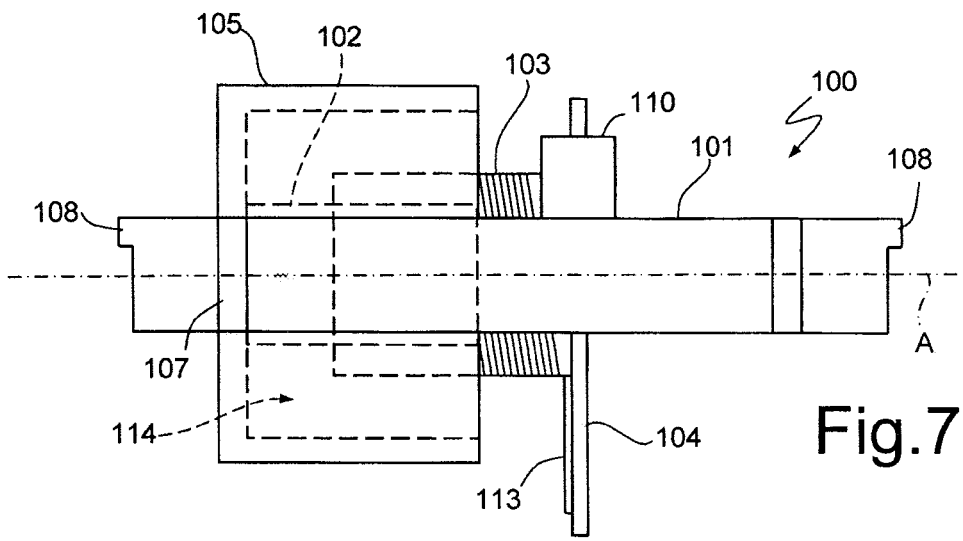
FIG. 7 is a side view of the micromotor of FIG. 6.
Figure 8:
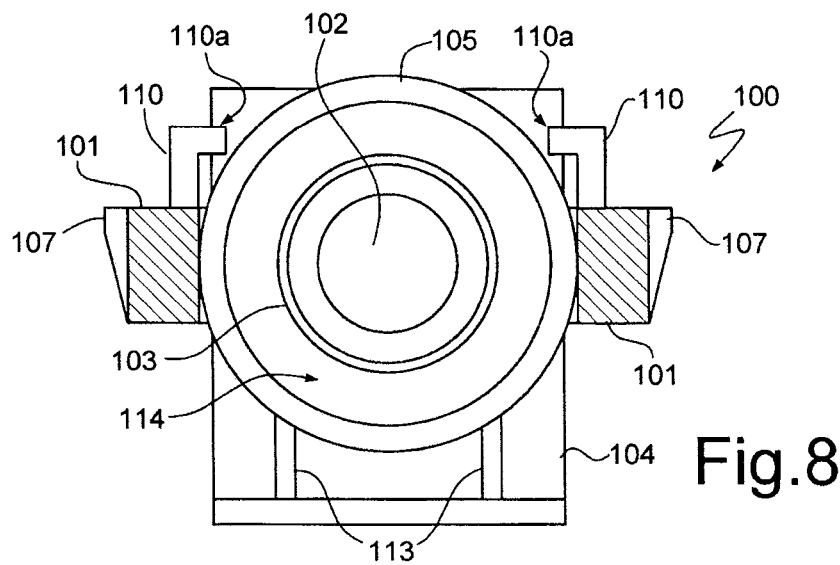
FIG. 8 is a cross-sectional view of the micromotor of FIG. 6, taken according to the line VIII-VIII of FIG. 6.
Figure 9:
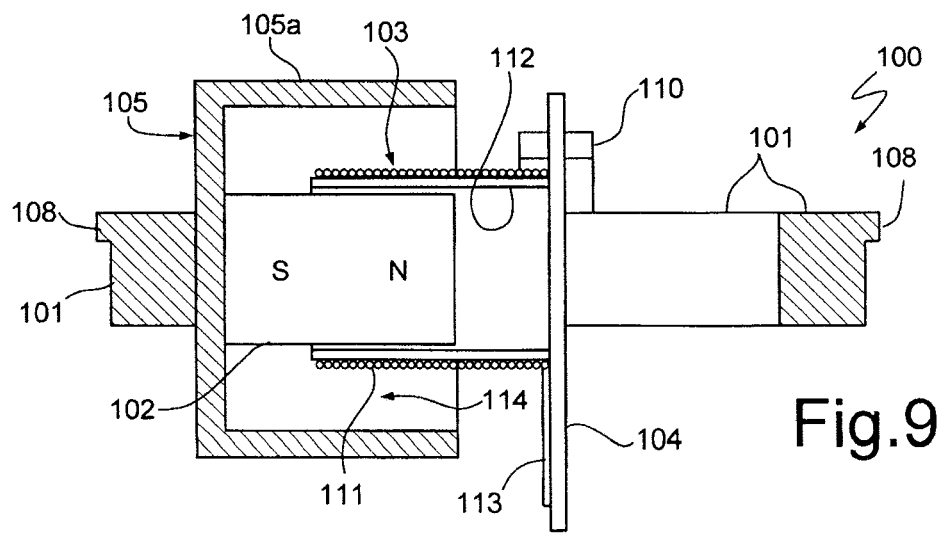
FIG. 9 is a longitudinal section of the micromotor of FIG. 6, taken according to the line IX-IX of FIG. 6.

With reference to FIG. 3, an example of a microelectromechanical device a mass storage device made by probe-storage technology will be described, i.e., one including a polymeric film that can be written by making indentations. In particular, in the ensuing description, a mass storage device 1 of the type described with reference to FIG. 1 is considered; consequently, the elements common to those of FIG. 1 are designated by the same reference numbers.

In FIG. 3, the common substrate 4, the cantilevers 3 and the R/W heads 6 are illustrated only partially and with a dashed line (even though, in the view of FIG. 3, they are located above the elements shown). The mass storage device 1 is having an a supporting and actuation device 15 (also referred to as "scanner"), which includes a plurality of movable platforms 12, each of which carries a respective polymeric film 5 on its own face set facing the R/W heads 6. In the embodiment illustrated here, four movable platforms 12 are present having the same shape and mass. Consequently, also four polymeric films 5 are present, each of which is coupled, in reading and writing, to a respective portion of the two-dimensional array 2 (not illustrated as a whole herein).

The supporting and actuation device 15 is housed in a seat 16, formed in a fixed supporting body 17 of semiconductor material. The supporting body 17 is in turn housed on a base plate 18, for example, a ceramic plate or PC board.

The movable platforms 12 are connected to one another in twos so as to form balanced pairs in which the inertia of one movable platform 12 opposes the inertia of the other movable platform 12. Each pair of movable platforms 12 is then supported and constrained to the supporting body 17 by a respective frame support 20, hereinafter simply referred to as "frame", which is also made of semiconductor material (in the embodiment described herein, two frames 20 are present). More precisely, the movable platforms 12 are connected to the respective frames 20 by first elastic elements 21, shaped so as to allow the movable platforms 12 to perform exclusively a relative translation in the direction y and, instead, prevent relative movements in the direction x. In the embodiment described herein, the first elastic elements 21 are plane plates made of semiconductor material, parallel to the direction x, which tend to keep the respective movable platforms 12 in pre-set resting positions.

The movable platforms 12 of each pair are moreover mutually coupled by first actuation bars 23, which oscillate about respective fulcra 25 and operate as rockers. The fulcra 25 are fixed to the frames 20 by respective anchorages 26.

The first actuation bars 23 are substantially rigid, and their ends are connected to the respective movable platforms 12 by means of elastic joints 27, which in practice define hinges. The movable platforms 12 of each pair are opposite with respect to longitudinal lines of the respective first actuation bars 23. In addition, given that the movable platforms 12 are the same as one another and have the same mass, the fulcra 25 are set in median points of the first actuation bars 23.

Each pair of movable platforms 12 and the respective first actuation bar 23 form a balanced system of slidable masses, connected by a rocker and aligned in the direction of sliding (i.e., in the direction y). In addition, the mass-and-rocker system is configured in such a way that corresponding to rocking movements of the first actuation bars 23 are translations of the respective movable platforms 12 along the line y in opposite directions. The two mass-and-rocker systems including the movable platforms 12 are symmetrical with respect to one another.

The frames 20 are connected to the supporting body 17 by second elastic elements 28 shaped so as to allow the frames 20 to perform exclusively a translation in the direction x and prevent, instead, relative movements in the direction y. The second elastic elements 21 are plane plates made of semiconductor material, parallel to the direction y, which tend to keep the respective frames 20 in pre-determined resting positions.

The frames 20 are moreover connected to one another by a second actuation bar 30, which oscillates about a fulcrum 31, directly anchored to the base plate 18, and forms a rocker. The second actuation bar 30 is substantially rigid and its ends are connected to respective frames 20 by elastic joints 32, which define hinges (similar to the elastic joints 27 of the first actuation bars 23 and not illustrated in detail). The frames 20 are opposite with respect to a longitudinal line of the second actuation bar 30. Also the frames 20 are the same as one another and have the same mass. For this reason, the fulcrum 31 is set in the median point of the second actuation bar 30.

The frames 20 and the second actuation bar 30 form a balanced system of slidable masses connected by a rocker and aligned in the direction of sliding (i.e., in the direction x), in such a way that the inertia of one frame 20 and of the movable platforms 12 connected thereto opposes the inertia of the other frame 20 with the respective movable platforms 12. In addition, the mass-and-rocker system is configured in such a way that corresponding to rocking movements of the second actuation bar 30 are translations of the frame 20 along the line x, in opposite directions.

The supporting and actuation device 15 performs positioning of the movable platforms 12 and, for this purpose, also includes four micromotors 100, two of which are coupled to the first actuation bar 23 of a respective pair of movable platforms 12, and two of which are coupled to the second actuation bar 30. More precisely, the first actuation bars 23 and the second actuation bar 30 have respective longitudinal extensions 40, made at the ends of which are connectors 41 with slots 42 for housing the micromotors 100. In particular, in the embodiment described herein, the connectors 41 are oriented in such a way that the longitudinal extensions 40 will be perpendicular to the lines A of movement of the respective micromotors 100 (FIGS. 4 and 5). The first actuation bars 12 and the second actuation bar 30, with the respective longitudinal extensions 40, form elements of transmission of the motion from the micromotors 100 to the respective movable platforms 12. More precisely, the first actuation bars 23 are rotated independently about the fulcra 25 by the respective micromotors 100, for moving the movable platforms 12 of each pair in opposite directions along the line y. Likewise, the second actuation bar 30 is rotated about the fulcrum 31 by the respective micromotors 100, for moving the frames 20 in opposite directions along the line x. Due to the conformation of the first elastic elements 21, moreover, the frames 20 draw along in the direction x the movable platforms 12 connected thereto when they are displaced. In this way, it is possible to control positioning of the movable platforms both in the direction x and in the direction y.

Any vibrations, accelerations and impact undergone by the mass storage device 1 produce stresses in the same direction along the line y on the movable platforms 12. In the presence of said stresses, then, the movable platforms 12 apply equal and opposite torques at the ends of the respective first actuation bars 23, and any movement is prevented. Likewise, external forces acting in the direction x transmit stresses in the same directions to the frames 20, which consequently apply equal and opposite torques to the second bar 30. Also any movement in the direction y is thus prevented, both for the frames 20 and for the movable platforms 12.

In addition, the mass-and-rocker systems formed by the movable platforms 12 with the first actuation bars 23 and by the frames 20 with the second actuation bar 30 are balanced in rotation and are thus insensitive also to stresses of a rotary type.

FIGS. 6-13 show in detail one of the micromotors 100, which in FIGS. 6-9 is illustrated prior to installation. The micromotor includes an assembly frame 101, a permanent magnet 102, a coil 103, having a supporting plate 104, and a ferromagnetic guide 105. The frame 101 is made of a dielectric material, such as, for example, a thermosetting polymeric material, and has the shape of a frame, in this case rectangular. The frame 101 is provided, on its outer faces, with clamping teeth 107 and contrast ribbings 108, for being mounted in a seat of a microelectromechanical device, as explained hereinafter.

The magnet 102 and the ferromagnetic guide 105 are fixed within the frame 101. Until installation of the micromotor 100 is completed, also the coil 103 is provisionally fixed to the frame 101, and is then freed and has the possibility of moving with respect to the magnet 102 and to the ferromagnetic guide 105.

In greater detail, the ferromagnetic guide 105, which is a cylindrical cup-shaped body and, in the example described, is made of iron, is welded to an internal face of the frame 101. The concave part of the ferromagnetic guide 105, delimited by a cylindrical expansion 105a of the ferromagnetic guide 105 itself, faces the coil 103 (see, in particular, FIG. 9). An outer diameter of the expansion 105a is approximately equal to an internal dimension of the frame 101 (perpendicular to the line A) in such a way that the ferromagnetic guide 105 can be introduced into its seat with only minor interference. Preferably, moreover, a line A of symmetry of the ferromagnetic guide 105 is aligned to a longitudinal line of the frame 101.

The magnet 102, which is of a cylindrical shape, is housed coaxial within the magnetic guide 105 and fixed to an end wall of the latter, for example, by means of a bonding layer (not shown). In addition, the length of the magnet 102 is substantially equal to an axial dimension of the expansion 105a, to which the magnet 102 is thus aligned. The ferromagnetic guide 105 and the magnet 102 form a magnetic circuit that minimizes the path in air of the lines of force of the magnetic field (flux) generated by the magnet 102 and, at the same time, has a shape and dimensions such as to enable introduction of the coil 103, as explained in what follows.

The coil 103 is bonded to the supporting plate 104, which is in turn fixed to the frame 101 in a mounting position by means of removable tabs 110 and engages respective notches 110a. The supporting plate 104 projects at the bottom from the frame 101 and carries connection lines 113 for electrical supply of the coil 103. The coil 103 includes a conductor 111 wound about a cylindrical bobbin 112, coaxial to the magnet 102 and to the ferromagnetic guide 105. The internal diameter of the bobbin 112 is sufficient to house the magnet 102, while the external diameter enables introduction of the coil 103 in an annular gap 114 between the magnet 102 and the expansion 105a of the ferromagnetic guide 105.

Figure 10:
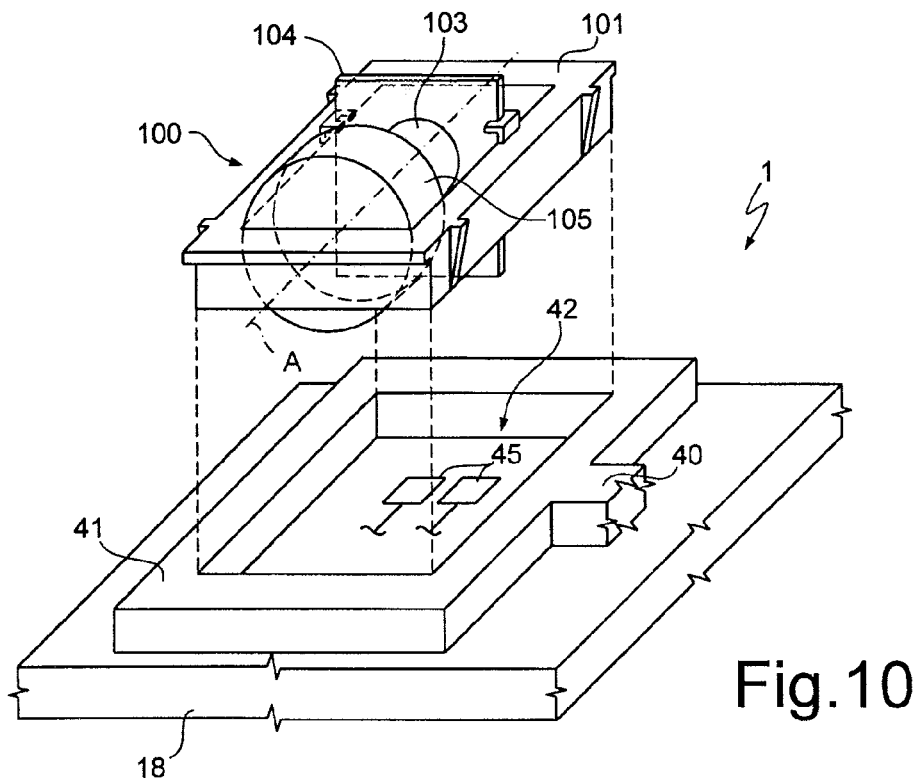
FIG. 10 is a three-quarters perspective view from above of a portion of the microelectromechanical device of FIG. 3 and of the micromotor of FIG. 6 in an assembly step.
Figure 11:
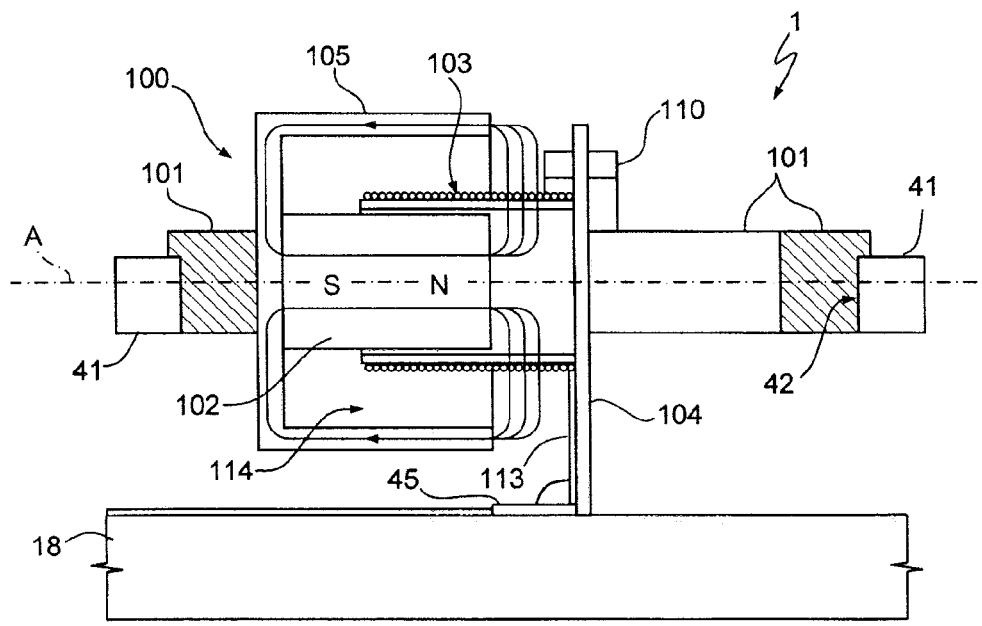
FIG. 11 is a longitudinal section of the micromotor of FIG. 6 and of a portion of the microelectromechanical device of FIG. 3 assembled, taken according to the line XI-XI of FIG. 3.

FIG. 10 illustrates a portion of the mass storage device 1 and the micromotor 100 in a step of assembly. Of the mass storage device 1, FIG. 10 shows only the base plate 18, a stretch of a longitudinal extension 40, for example, of one of the first actuation bars 23 (not shown herein), and the respective connector 41, with the slot 42 made therein. In addition, elastic return elements (in this case the elastic elements 21, not illustrated herein) enable the longitudinal extension 40 and the connector 41 to be kept in a resting position (in the absence of activity of the micromotor 100). The micromotor 100 is inserted in the slot 42 by interference fit and remains blocked in particular on account of the action of the clamping teeth 108. As is shown in FIG. 11, the supporting plate 104 of the coil 103 projects sufficiently to reach the base plate 18, where connection pads 45 have been provided. In the embodiment described herein, the longitudinal extension 40 is substantially perpendicular to the line A of the magnet 102, of the coil 103, and of the ferromagnetic guide 105.

Once the micromotor 100 is secured in its own seat, the supporting plate 104 is welded to the base plate 18, and the connection lines 113 are connected to respective connection pads 45.

When the supporting plate 104 is stably constrained to the base plate 18, the tabs 110 (illustrated herein with a dashed line) are removed. For example, the tabs 110 can be broken or cut. In this way, the bond is eliminated between the supporting plate 104 and the frame 101 of the micromotor 100, which hence can move with respect to one another. Consequently, by supplying controlled driving currents to the coil 103, it is possible to apply a force to the magnet 102 to translate it along the line A, thus drawing along also the longitudinal extension 40 of the respective actuation bar (in this case, one of the first actuation bars 23). The ferromagnetic guide 105 concentrates the lines of force of the magnetic field generated by the magnet 102, preventing them from dispersing in air. Given the same number of turns involved, then, the magnetic flux concatenated by the coil 103 is hence optimized.

Figure 12:
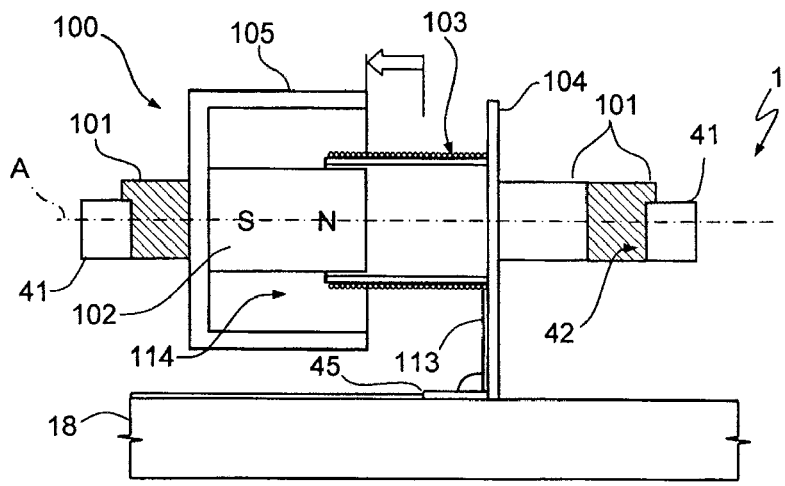
FIGS. 12 and 13 show the micromotor of FIG. 6 in a first operating configuration and in a second operating configuration, respectively.
Figure 13:
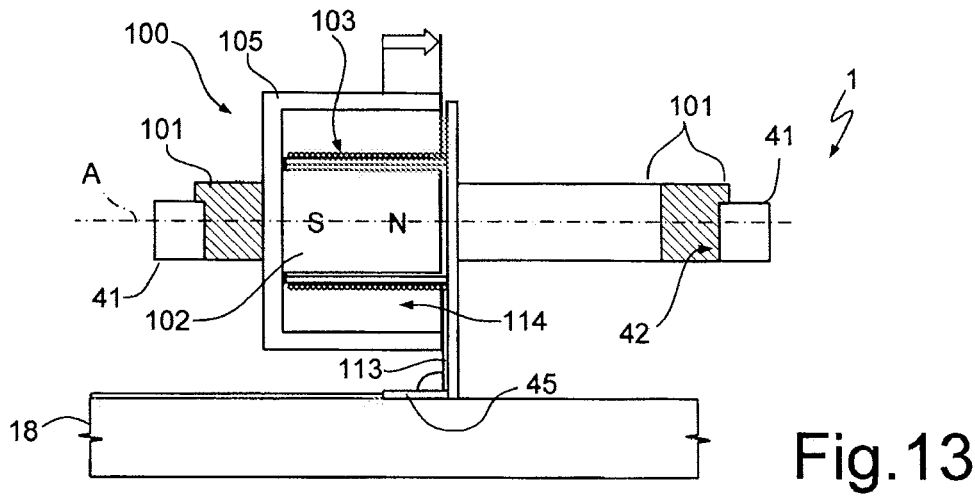

FIGS. 12 and 13 show the micromotor 100 in use, in two different operating conditions. In FIG. 12, the coil 103 is driven so as to repel the magnet 102 to a maximum distance. Instead, in the configuration of FIG. 13, the coil is supplied with an opposite current and attracts the magnet 102 to a minimum distance.

The magnetic circuit formed by the magnet 102 and by the ferromagnetic guide 105 is highly efficient and enables optimization of the magnetic flux concatenated by the coil 103. In addition to the fact that the embodiment described enables the use of a single magnet 102, the efficiency of the magnetic circuit enables drastic reduction both of the dimensions of the components and of the current consumption. The micromotor 100 is hence particularly suitable for applications in which encumbrance is a critical factor. The assembly of the micromotor 100 is moreover extremely simple and precise. The components of the micromotor 100, in fact, can be aligned in an optimal way in a fabrication step, without the limitations imposed by the structure of the microelectromechanical device for which the micromotor 100 is designed. The entire micromotor 100 is then inserted in seat with a single operation of assembly, without its parts being able to move with respect to one another. The movable parts are then released, after welding of the supporting plate 104 of the coil 103.

Figure 14:
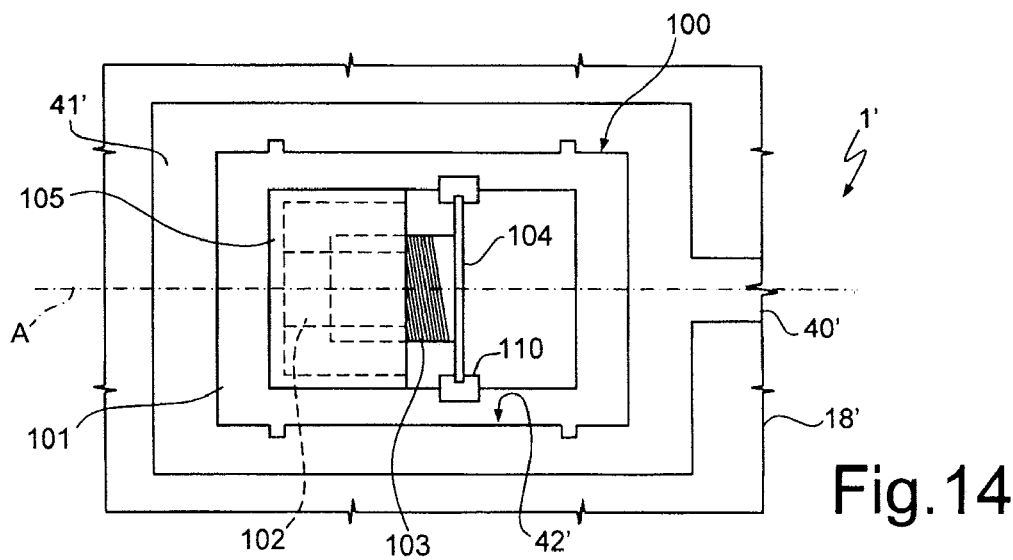
FIG. 14 is a top plan view of a portion of a microelectromechanical device according to a second embodiment of the present disclosure.

In an embodiment of the disclosure, illustrated in FIG. 14, a microelectromechanical device, in particular a mass storage device 1' obtained using probe-storage technology, includes at least one micromotor 100, and a connector 41', having a slot 42' for housing the micromotor 100. The connector 41' has an actuation bar 40' perpendicular to the line A of the micromotor 100. After the tabs 110 (illustrated with a dashed line) have been removed, the movable parts of the micromotor 100 translate along the line A, drawing along the connector 41' and the actuation bar 40' with respect to a base plate 18' to which the coil 103 is fixed.

Figure 15:
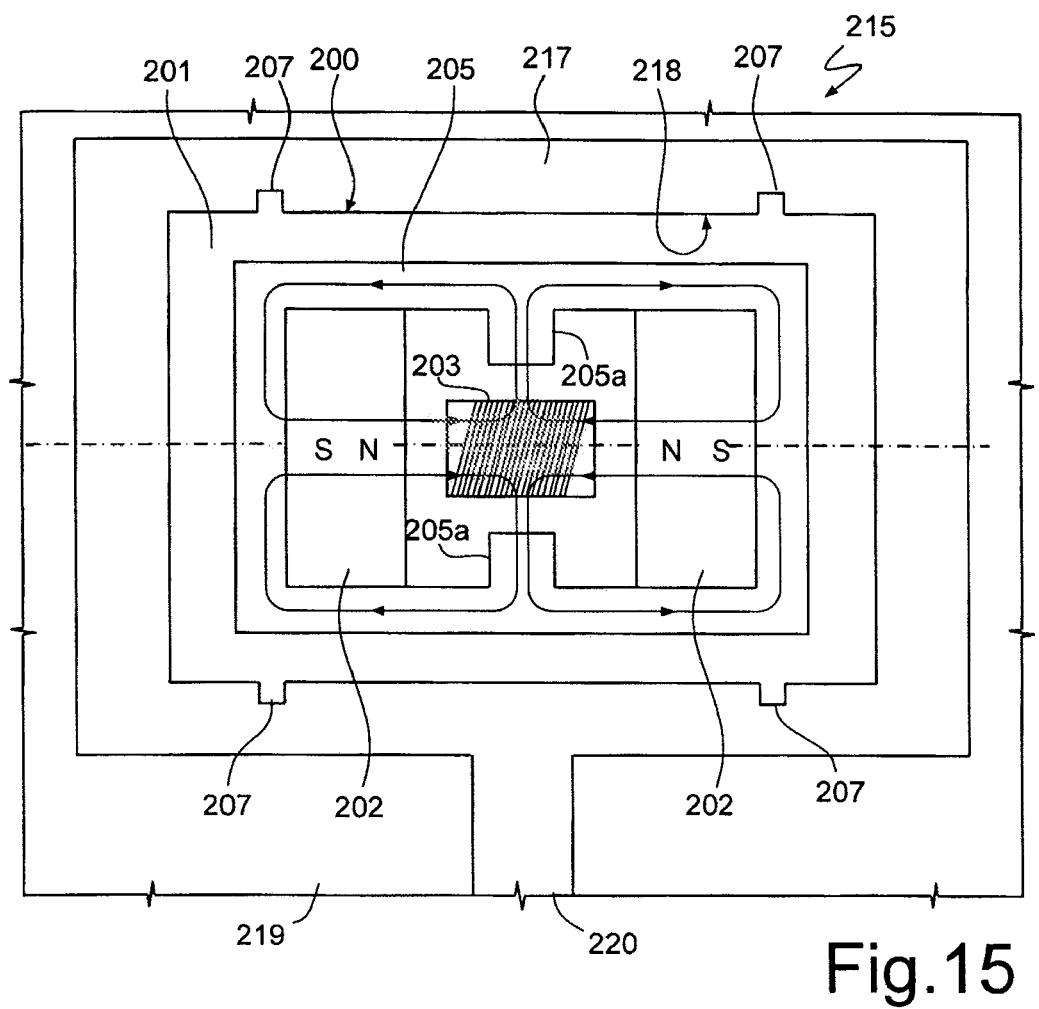
FIG. 15 is a top plan view of a portion of a microelectromechanical device according to a third embodiment of the present disclosure.
Figure 16:
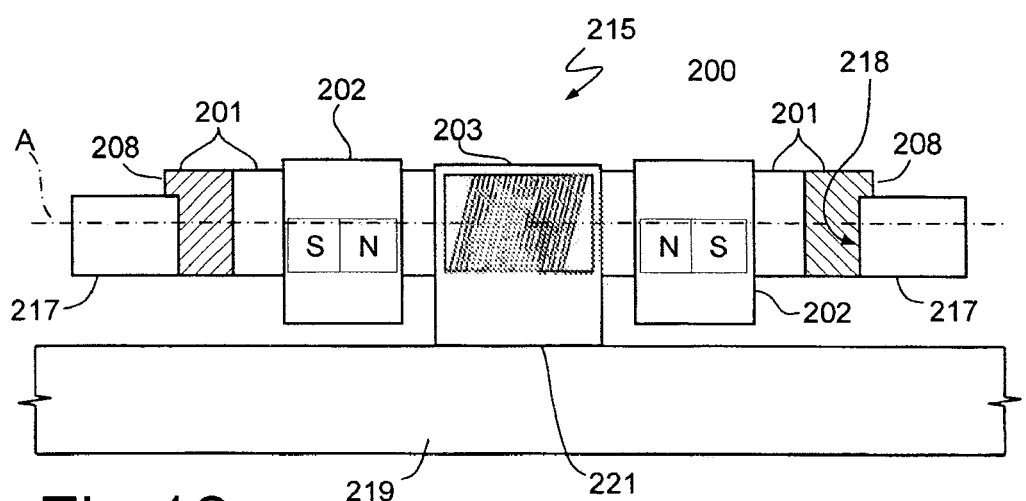
FIG. 16 is a longitudinal section of the microelectromechanical device of FIG. 15, taken according to the line XVI-XVI of FIG. 15.

FIGS. 15 and 16 show a third embodiment of the disclosure. In this case, a microelectromechanical device 215 includes a micromotor having an assembly frame 201, two permanent magnets 202, a coil 203, having a supporting plate 204, and a ferromagnetic guide 205.

The frame 201 is made of a dielectric material and has the shape of a frame, in this case rectangular. The frame 201 is provided, on its outer faces, with clamping teeth 207 and contrast ribbings 208, for being mounted in a seat of a microelectromechanical device.

The ferromagnetic guide 205 is shaped like a rectangular frame and is housed within the frame 201. At midpoints of opposite sides, the ferromagnetic guide 205 has two expansions 205a, which extend towards one another and are set at a distance from one another by an amount sufficient to house the coil 203 with clearance. The magnets 202 are in turn arranged within the ferromagnetic guide 205, at opposite longitudinal ends thereof, and are oriented so as to present to one another the same polarities. The expansions 205a are set between the magnets 202.

The frame 201, the magnets 202, and the ferromagnetic guide 205 are pre-assembled and are inserted by interference fit in a slot 218, which is made in a connector 217 of a microelectromechanical device 215 and has an actuation bar 220.

The coil 203 is fixed to a base plate 219 of the microelectromechanical device 215, for example, embedded in a resin support 221, and its turns are arranged in planes parallel to a longitudinal line A of the ferromagnetic guide 205.

Figure 17:
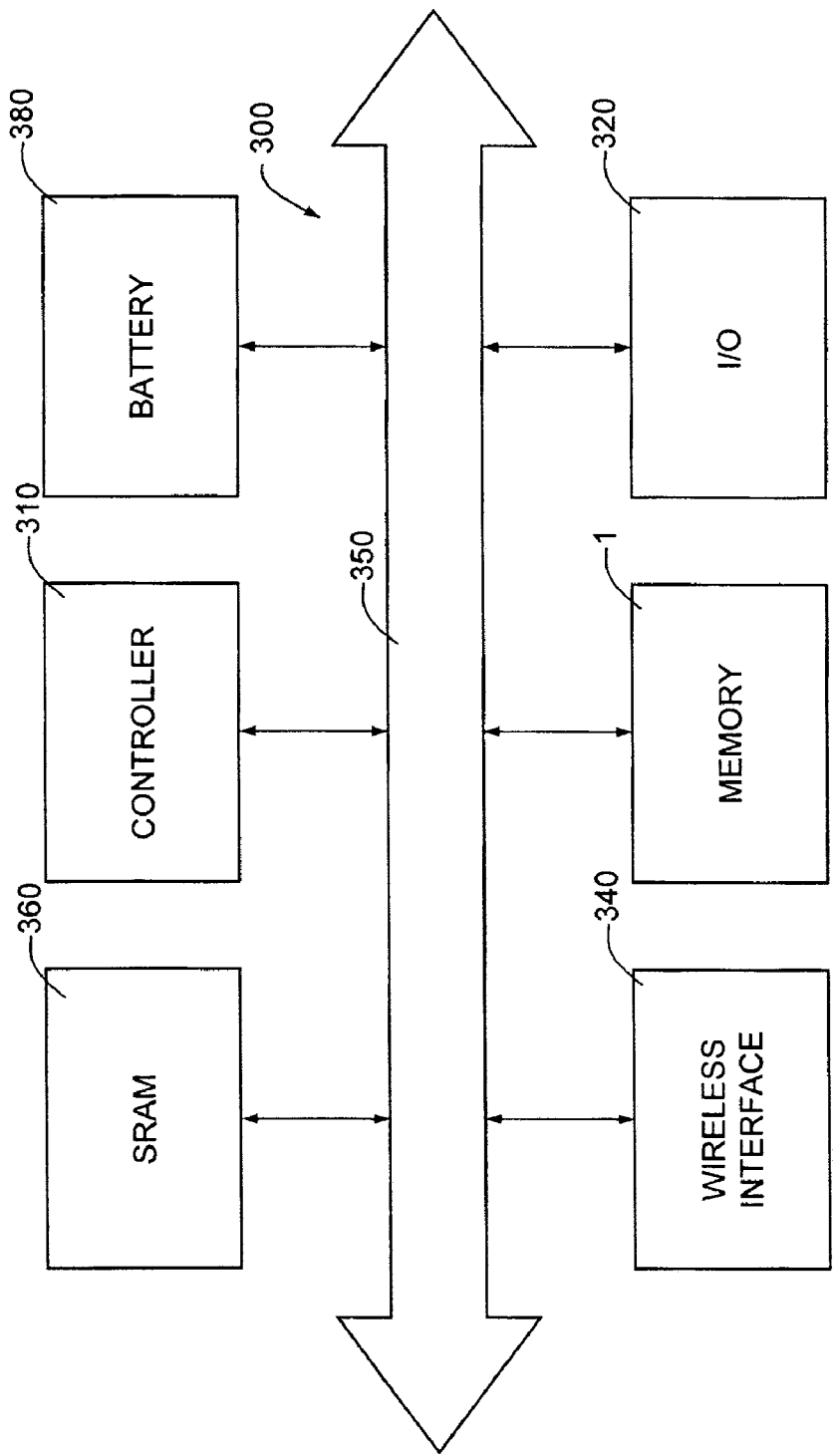
FIG. 17 is a simplified block diagram of an electronic system incorporating a microelectromechanical mass storage device according to the present disclosure.

FIG. 17 illustrates a portion of a system 300 according to an embodiment of the present disclosure. In particular, the system 300 incorporates a mass storage device, for example, the mass storage device 1 described with reference to FIGS. 3-11, and is suitable for being used in applications that require sequential storage and reading of large amounts of data. For example, the system 300 can be used in devices such as a digital music player, a digital film reproducer, a camcorder or a digital camera, a cell phone (especially if having image-acquisition functions), a palm-top computer (personal digital assistant, PDA), a laptop or portable computer, possibly with wireless capacity, a messenger device, or other devices designed to process, store, transmit or receive information.

The system 300 can include a controller 310, an input/output (I/O) device 320 (for example, a keyboard or a display), the mass storage device 1, a wireless interface 340 and a working storage 360, of a volatile or non-volatile type, coupled to one another through a bus 350. In one embodiment, a battery 380 can be used for supply of the system 300. It is to be noted that the scope of the present disclosure is not limited to embodiments having necessarily one or all of the devices listed.

The controller 310 may include, for example, one or more microprocessors, microcontrollers, and the like. The I/O device 320 can be used for generating a message. The system 300 can use the wireless interface 340 for transmitting and receiving messages to and from a wireless communication network with a radiofrequency (RF) signal. Examples of wireless interface can include an antenna, a wireless transceiver, such as a dipole antenna, even though the scope of the present disclosure is not limited from this point of view. In addition, the I/O device 320 can supply a voltage representing what is stored both in the form of digital output and in an analog form.

Finally, it is clear that modifications and variations may be made to the microelectromechanical device described, without thereby departing from the scope of the present disclosure, as defined in the annexed claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical device, comprising:
a fixed supporting body;
at least one semiconductor body structured to be movable with respect to the fixed supporting body; and
at least one micromotor structured to move the semiconductor body with respect to the fixed supporting body, the micromotor having at least one permanent magnet and a coil coupled together and movable with respect to one another, and a ferromagnetic guide coupled to the magnet and shaped so as to concentrate lines of magnetic field generated by the magnet towards the coil.

2. The device according to claim 1, wherein the semiconductor body includes a mechanical connector, and wherein the ferromagnetic guide and the magnet are carried by the connector.

3. The device according to claim 2, wherein the micromotor includes a frame coupled to the ferromagnetic guide and the magnet.

4. The device according to claim 2, wherein the frame is rectanular-shaped and is made of polymeric material.

5. The device according to claim 3, wherein the connector has a seat for housing the frame.

6. The device according to claim 5, wherein the semiconductor body includes a transmission element connected to the connector and structured to transmit motion to movable parts of the semiconductor body.

7. The device according to claim 1, wherein the ferromagnetic guide is cup-shaped, and the magnet is housed within the ferromagnetic guide.

8. The device according to claim 7, wherein the ferromagnetic guide and the magnet are substantially of a cylindrical shape.

9. The device according to claim 7, wherein the ferromagnetic guide, the magnet, and the coil are coaxial.

10. The device according to claim 9, wherein the coil is structured to be inserted in a gap defined between the ferromagnetic guide and the magnet.

11. The device according to claim 1, wherein the coil is fixed to the fixed supporting body.

12. The device according to claim 1, comprising a mass storage device, wherein the mass storage device includes:
an array of cantilevers, each supporting a respective R/W head;
a data-storage layer material arranged adjacent to the R/W heads;
and wherein the semiconductor body forms an actuation and supporting device for supporting the data-storage material.

13. The device according to claim 12, wherein the actuation and supporting device includes a plurality of movable platforms, each supporting a respective portion of the data-storage material; and wherein the movable platforms are mutually connected in pairs in such a way that the inertia of one movable platform of one pair balances the inertia of the other movable platform of the same pair.

14. The device according to claim 13, wherein the actuation and supporting device has movable supporting bodies mutually connected in pairs and structured so that the inertia of one movable supporting body of the pair balances the inertia of the other movable supporting body of the pair, and wherein each pair of movable platforms is supported and constrained to the fixed supporting body by a respective movable supporting body.

15. The device according to claim 14, wherein the actuation and supporting device has at least four movable platforms, forming two pairs of movable platforms, and two movable supporting bodies.

16. The device according to claim 14, wherein the movable platforms of each pair of movable platforms are mutually connected and structured to slide along a first line in opposite directions.

17. The device according to claim 16, wherein the movable supporting bodies of each pair of movable supporting bodies are mutually connected and structured to slide along a second line in opposite directions, the second line being substantially perpendicular to the first line.

18. A system, comprising:
a control unit;
a mass storage unit coupled to the control unit, the mass storage unit including:
a fixed supporting body;
at least one semiconductor body movable with respect to the fixed supporting body; and
at least one micromotor structured to move the semiconductor body with respect to the fixed supporting body, wherein the micromotor includes at least one permanent magnet and a coil coupled together and movable with respect to one another, and a ferromagnetic guide coupled to the magnet and shaped so as to concentrate lines of magnetic field generated by the magnet towards the coil.

19. The system of claim 18, wherein the ferromagnetic guide is cup-shaped, and the magnet is housed within the ferromagnetic guide.

20. The system of claim 19, wherein the ferromagnetic guide and the magnet are substantially of a cylindrical shape.

21. The system of claim 20, wherein the ferromagnetic guide, the magnet, and the coil are coaxial.

22. A mass storage device, comprising:
a supporting structure; and
at least one semiconductor body movable with respect to the supporting structure, and at least one micromotor coupled to the semiconductor body by a connector, the micromotor structured to move the semiconductor body with respect to the fixed supporting element, the micromotor having at least one permanent magnet and a coil movable with respect to one another, and having a ferromagnetic guide coupled to the magnet and shaped to concentrate lines of magnetic field generated by the magnet toward the coil.

23. The device of claim 22, wherein the device further includes an array of cantilevers, each supporting a respective read/write head, a data-storage layer formed on the semiconductor body and arranged adjacent the read/write heads, and wherein the ferromagnetic guide is cup-shaped and the magnet is housed within the ferromagnetic guide.

24. The device of claim 23, wherein the ferromagnetic guide and the magnet have a substantially cylindrical shape, and wherein the ferromagnetic guide, the magnet, and the coil are coaxial.

* * * * *